United States Patent [19]

Gold

[11] Patent Number: 5,478,132
[45] Date of Patent: Dec. 26, 1995

[54] AUTO WINDOW MOLDING AND METHOD OF MANUFACTURING SAME AT LEAST PARTIALLY IN SITU

[76] Inventor: Peter Gold, 465 N. Wood Rd., Rockville Centre, N.Y. 11570

[21] Appl. No.: 228,383

[22] Filed: Apr. 15, 1994

[51] Int. Cl.$^6$ ..................................................... B60J 10/02
[52] U.S. Cl. ................. 296/146.15; 296/93; 52/204.591; 52/208
[58] Field of Search .................................. 296/93, 96.21, 296/146.15, 201; 52/208, 204.591, 204.597

[56] References Cited

U.S. PATENT DOCUMENTS 4,984,839  1/1991  Miyakawa et al. ..................... 296/93

*Primary Examiner*—David M. Mitchell
*Assistant Examiner*—Andrew C. Pike
*Attorney, Agent, or Firm*—Galgano & Burke

[57] ABSTRACT

An auto window molding for mounting an auto window in a window opening defined by a generally L-shaped body flange via a peripheral molding attached thereto includes a peripherally-extending, generally U-shaped base section receivable about the peripheral edge of an auto window. The U-shaped base section has a central wall, a top wall and a bottom wall, and a resilient detachable arm secured to the base section which normally overlies and is spaced from the bottom wall. The arm has a free end which extends past the bottom wall and which normally engages a bottom surface of an auto window when the U-shaped base section is received about the peripheral edge thereof whereupon the bottom wall, detachable arm, and auto window cooperatively define therebetween a mold cavity into which a curable adhesive may be introduced which, upon curing, provides the auto window with a peripheral molding secured thereto molded in situ. In addition, the invention concerns a method of manufacturing an auto window molding at least partially in situ comprising the steps of placing an auto window molding on a peripheral edge of an auto window in the manner described above and introducing a curable adhesive into the molding cavity and allowing the curable adhesive to cure so as to form the auto window with a peripheral molding secured thereto, molded in situ.

10 Claims, 1 Drawing Sheet

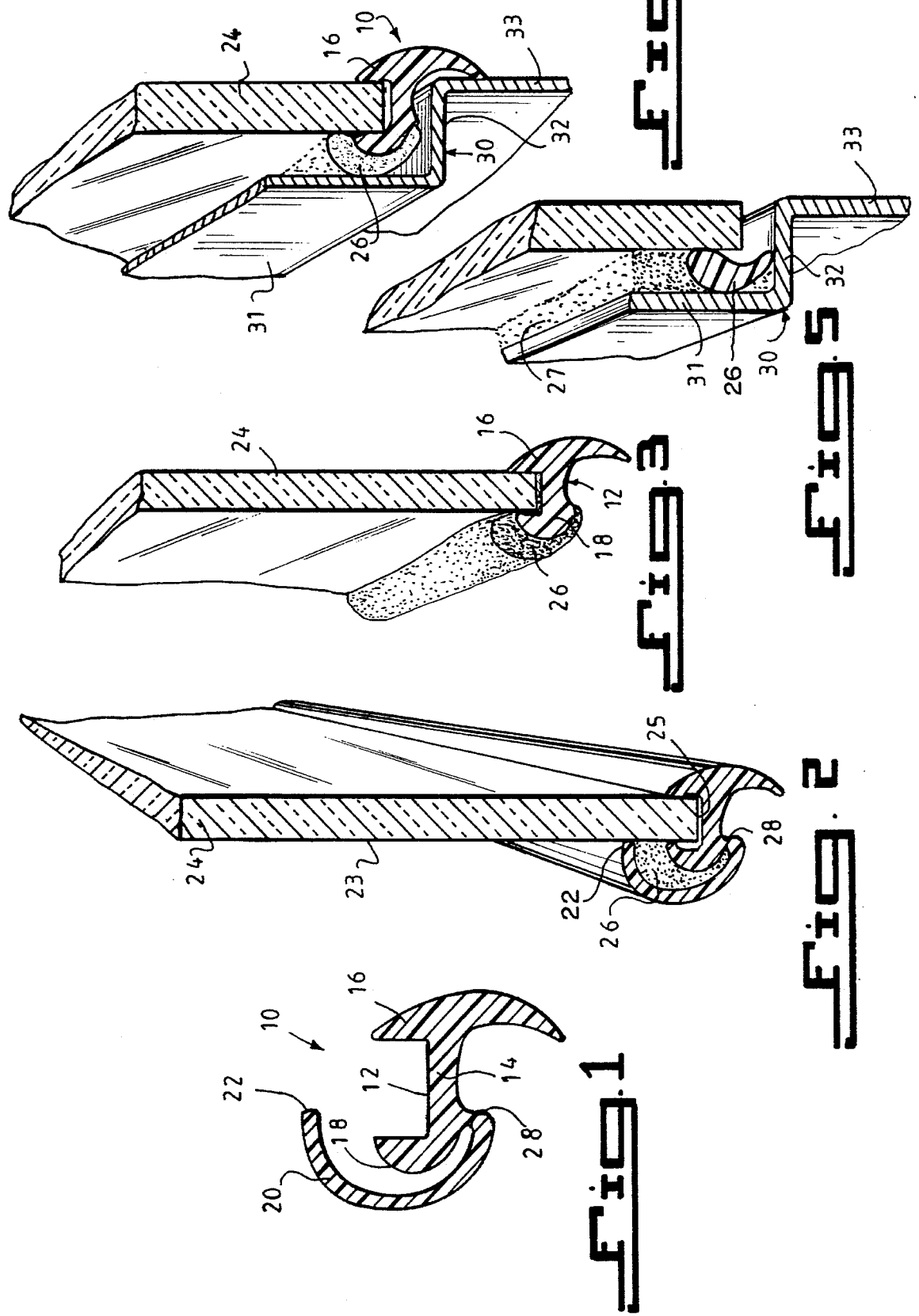

AUTO WINDOW MOLDING AND METHOD OF MANUFACTURING SAME AT LEAST PARTIALLY IN SITU

BACKGROUND OF THE INVENTION

1. Field of the Invention

The present invention relates to an auto window molding for mounting an auto window panel in an auto window opening defined by a generally L-shaped auto body panel flange. In addition, the invention concerns a method for manufacturing an auto window molding at least partially in situ.

2. Prior Art

A variety of car windshields are installed with peripheral framing which allows the framer to apply, in situ, the frame around the peripheral edge of the windshield. The method of manufacturing the frame is extremely costly, involving molds costing millions of dollars each. In addition, the assembly of the frame requires that the glass be transferred from the glass bending line to another section of the factory to have the frame applied to the auto glass periphery. This modular framing process is generally known to those in the art as "reaction injected molding" ("RIM").

Notwithstanding the significantly costs of reaction injection molding, it does afford significant savings as it allows the vehicle manufacturer to eliminate previously needed sections of moldings, retaining clips, spacers, etc., normally required to install auto glass and it also significantly lowers the labor costs associated therewith. Nevertheless, the vehicle manufacturer still incurs significant costs with this framing process. As mentioned above, reactive injected molding (RIM) requires expensive specialized tooling and hands-on labor. Furthermore, the resultant peripheral framing has no retention characteristics when applied adhesively to a vehicle body panel opening (see U.S. Pat. No. 4,986,595).

An excellent example of the wasteful costs associated with RIM can be observed in connection with its use on the rear back window of the 1993 Ford Aerostar passenger van produced by Ford Motor Company, Dearborn, Mich. This RIM framed auto window is retained on the vehicle by the provision of a plurality of nut and bolt fasteners integrally mounted on the RIM framing and a plurality of holes in the flange of the recessed body panel to allow the mechanical attachment of the entire window assembly. In addition, a butyl adhesive is applied between the flange of the body panel and the side of the RIM molding facing the body panel. By comparison the front windshield of the same vehicle does not use any RIM framing but instead uses a method of application shown in my earlier U.S. Pat. No. 4,850,640 where as shown most clearly in FIG. 9 thereof, an adhesive retains the auto window in the flange without the use of any mechanical attachments. The added cost to Ford Motor Company by using RIM framing to the back window in comparison to an adhesively applied auto window is approximately thirty-five million dollars for every one million vehicles produced.

The prior art teaches those in the art that the least expensive way to peripherally frame windshields is to extrude an auto window molding and apply it to the peripheral edge of the auto window (see, e.g. U.S. Pat. No. 1,259,117). A pioneering advancement is disclosed in my earlier U.S. Pat. No. 4,850,640 wherein an extruded molding is disclosed having an off center stem portion relative to the crown of the molding that allows the elastomeric molding to, in fact, be applied to squared corners of an auto window without resulting in crimping as in a continuous extruded molding, thus, obsoleting the "need" for sections of moldings and even RIM framed auto windows. However, even this technique requires the provision of separate spacers or seal members on which the glass rests which must be carefully positioned so that the glass will properly seat thereon and be perfectly positioned so that it lies flush with the body panel.

SUMMARY OF THE INVENTION

Accordingly, it is an object of the present invention to provide a novel and less costly peripheral framing system or molding that can outperform RIM framing.

It is a further object of the present invention to provide such a novel peripheral framing system which utilizes curable adhesives to eliminate mechanical retaining and spacer devices.

It is another object of the present invention to provide a novel molding and method of providing the same which allows one to produce either a total or a partial peripheral framing system.

It is yet a further object of the present invention to provide a molding which requires extremely "low tech" manufacturing methods and techniques, thereby affording low tooling and manufacturing costs.

Certain of the foreign and related objects are readily attained in an auto window molding for mounting an auto window in a window opening defined by a generally L-shaped auto body flange via a peripheral molding attached thereto, which includes a peripherally extending, generally U-shaped base section receivable about the peripheral edge of an auto window. The U-shaped base section has a central wall, a top wall and a bottom wall, and a resilient detachable arm secured to the base section which normally overlies and is spaced from the bottom wall. The arm has a free end which extends past the bottom wall and which normally engages a bottom surface of an auto window when the U-shaped base section is received about the peripheral edge thereof. Whereupon the bottom wall, detachable arm, and auto window cooperatively define therebetween a mold cavity into which a curable adhesive may be introduced. Upon curing, the adhesive provides the auto window with a peripheral molding secured thereto molded in situ.

Preferably, the arm is generally arcuate and has a weakened section by which it may be detached from the base section. Most advantageously, the detachable arm is secured to the central wall of the base section. Most desirably, the top wall comprises a protective and decorative trim portion which is dimensioned and adapted to bridge the space between the auto window and the body panel in overlying engagement therewith.

Certain of the foregoing and related objects of the invention are also attained in a method of manufacturing an auto window molding at least partially in situ, comprising the steps of placing an auto window molding of the aforementioned type according to the present invention, on the peripheral edge of an auto window and introducing a curable adhesive into the mold cavity and allowing the adhesive to cure so as to form an auto window with a peripheral molding secured thereto, molded in situ.

Preferably, the adhesive is polyurethane. In one preferred embodiment, the method includes the step of detaching the arm from the base section after the "introducing" step. In a further preferred embodiment, the method includes the step of removing the auto window molding from the window and the peripheral molding after said "introducing" step. Most desirably, the method also includes the steps of placing the auto window into a window opening defined by a L-shaped body panel flange with the peripheral molding serving to properly space the window from the flange and introducing a curable adhesive into the space between the window and flange which upon curing, which secures the auto window to said body panel flange.

BRIEF DESCRIPTION OF THE DRAWINGS

Other objects and features of the present invention will become apparent from the following detailed description considered in connection with the accompanying drawings which disclose one embodiment of the present invention. It should be understood, however, that the drawings are designed for the purpose of illustration only and not as a definition of the limits of the invention.

In the drawings,

FIG. 1 is a cross-sectional view of the auto glass molding embodying the present invention;

FIG. 2 is a fragmentarily illustrated perspective view, in part section, of the auto glass molding attached to an auto glass via a curable adhesive;

FIG. 3 is a fragmentarily illustrated perspective view, in part section, similar to that of FIG. 2, but showing the detachable arm of the molding removed;

FIG. 4.is a fragmentarily illustrated perspective view, in part section, showing the inventive molding attached to the auto glass but with the detachable arm removed, and being mounted in the body panel of an auto; and FIG. 5 is a fragmentarily illustrated, perspective view, in part section, showing the auto glass adhesively secured in a recessed body panel of an auto via the cured adhesive peripherable framing made in situ according to the present invention.

DETAILED DESCRIPTION OF THE PREFERRED EMBODIMENTS

Referring now in detail to the drawings, therein illustrated is a novel auto window molding embodying the present invention, generally designated 10, which is specifically intended for mounting a fixed auto window in an window opening of a vehicle via a peripheral molding molded in situ according to the present invention, as described in detail hereinafter.

As shown in FIG. 1, the molding 10 which is preferably made from extruded plastic comprises an elongated member having a generally U-shaped base section, generally designated 12, receivable about the peripheral edge of an auto window and which is composed of a central wall 14, a top wall 16 and a bottom wall 18. Attached to the rear of the central wall 14 is a resilient and arcuate detachable arm 20 which normally overlies and is spaced from the bottom wall 18. As shown in FIG. 2, the arm has a free end 22 which extends past the bottom wall 18 and which normally engages the bottom surface 23 of an auto window 24 when the U shaped base section 12 is received about the peripheral edge 25 thereof, (and optionally affixed thereto via an adhesive), whereupon the bottom wall 18, detachable arm 20, and auto window glass 24 cooperatively define therebetween a mold cavity into which a curable adhesive 26, preferably polyurethane, may be introduced. Upon curing, the adhesive 26 forms a relatively permanent attachment to the bottom surface 23 of the auto window glass 24 and thereby provides an auto window with a peripheral molding, formed in situ, secured thereto of cured adhesive 26.

The resilient detachable arm 20 has a point or a line of weakening 28 at its attachment point adjacent to the central wall 14 of the U-shaped base section 12 so as to allow the same to be optionally removed, as shown in FIG. 3. As shown in FIG. 4, the remaining portion of the mold, i.e., the U-shaped base section 12, together with the peripheral molding 26 which is secured to the glass 24 can then be introduced into the recessed L-shaped flange 30 of the body panel 33 without any additional retaining or spacing means. As can be seen therein, the cured adhesive 26 provides the proper spacing for the glass panel 24 with respect to the base 31 of the flange 30 as well as the side wall 32 thereof. In addition, the top wall 16 of the U-shaped base section 12 is in the form of a protective and decorative umbrella-shaped trim portion or cap which is dimensioned and adapted to bridge the space between the auto window 24 and the body panel 33 in overlying engagement therewith, thereby further sealing the window 24 and protecting against the entry of air, water, etc., into the vehicle via the window opening flange 30.

As can be further seen in FIG. 5, the entire molding 10 can optionally be removed with the exception of the peripheral molding 26 which is affixed to the glass 24. For either case (either the embodiment of FIG. 4 or FIG. 5) and as shown in FIG. 5, a further polyurethane adhesive 27 would be applied between the glass 24 and base wall 31 of the flange 30 to secure both the glass panel 24 and the peripheral molding 26 to the flange 30 of the auto body panel 33.

It should be appreciated that the actual height and width of the peripheral molding 26 will effect the spacing of the glass 24 above the base wall 31 and in from the sidewall 32 of the flange 30. This can be adjusted by changing the configuration and dimensions of the various components and of the detachable arm 20 of the auto window molding 10. Due to the fact that the arm 20 is resilient, when the molding is applied to the glass (such as shown in FIG. 2), the free end 22 of the detachable arm 20 will strike the glass 24 and subsequently be pushed slightly upward. As shown in FIG. 1, the free end 22 normally projects across the U-shaped channel of the base section 12, but in FIG. 2 the glass 24 pushes it back so that it is aligned with the inner side of bottom wall 18. The length of the arm 20 and the cavity formed thereby, as well the amount of adhesive to be needed to fill the cavity, can therefore be adjusted to provide different heights or widths for the peripheral molding to be formed which, in turn, affects the positioning of the glass. In fact, the arm could be provided with additional lines of weakening adjacent its free end to allow one to remove portions thereof when framing the glass to adjust the height of the mold cavity formed thereby.

While polyurethane preferably is used as a curable adhesive, other adhesives could be employed as well. However, it is preferable that an adhesive be used that has a greater coefficient of adhesion with respect to the glass than with respect to the auto window molding 10 so that the subsequently formed peripheral molding 26 will remain affixed to the glass 24 even when it is desired to remove the auto molding 10 from the glass 24 and the cured adhesive, thereby allowing the various mold options as discussed above.

As can be seen, the present invention allows one simply with a tube of urethane adhesive and the inventive molding to apply a windshield to a vehicle not for a cost of millions of dollars for molds, but for pennies in comparison. Moreover, a far superior framing system is provided that is far stronger in compatability to the urethane adhesive to retain both the modular framing and the auto window simultaneously.

Thus, while only several embodiments of the present invention have been shown and described, it is to be understood that many changes and modifications may be made thereunto without departing from the spirit and scope of the invention as disclosed herein.

What is claimed is:

1. An auto window molding for mounting an auto window in a window opening defined by a generally L-shaped auto body flange via a peripheral molding attached thereto, said auto window molding comprising:

a peripherally extending, generally U-shaped base section receivable about a peripheral edge of the auto window, said U-shaped base section having a central wall, a top wall, a bottom wall, and a resilient detachable arm secured to said base section which normally overlies and is spaced from said bottom wall, said arm having a free end which extends past said bottom wall and which normally engages a bottom surface of the auto window when said U-shaped base section is received about the peripheral edge thereof, whereupon said bottom wall, said detachable arm, and said auto window cooperatively define therebetween a mold cavity into which a curable adhesive may be introduced which, upon curing, provides said auto window with said peripheral molding secured thereto molded in situ.

2. The auto window molding of claim 1, wherein said arm is generally arcuate.

3. The auto window molding of claim 1, wherein said arm has a weakened section by which it may be detached from said base section.

4. The auto window molding of claim 1, wherein said detachable arm is secured to said central wall of said base section.

5. The auto window molding of claim 1, wherein said top wall comprises a protective and decorative trim portion which is dimensioned and adapted to bridge a space between the auto window and a body panel in overlying engagement therewith.

6. A method of manufacturing an auto window molding at least partially in situ, comprising the steps of:

placing said auto window molding on a peripheral edge of an auto window, said auto window molding having a peripherally extending, generally U-shaped base section receivable about the peripheral edge of said auto window, said U-shaped base section having a central wall, a top wall, a bottom wall, and a resilient detachable arm secured to said base section which normally overlies and is spaced from said bottom wall, said arm having a free end which extends past said bottom wall and which normally engages a bottom surface of said auto window when said U-shaped base section is received about the peripheral edge thereof whereupon said bottom wall, said detachable arm, and said auto window cooperatively define therebetween a mold cavity into which a curable adhesive may be introduced; and introducing said curable adhesive into said molding cavity and allowing said curable adhesive to cure so as to form said auto window with said peripheral molding secured thereto, molded in situ.

7. The method of claim 6, wherein said curable adhesive is polyurethane.

8. The method of claim 6, additionally including the step of detaching said arm from said base section after said introducing step.

9. The method of claim 6, additionally including the step of removing said auto window molding from said window and said peripheral molding after said introducing step.

10. The method of claim 9 additionally including the steps of placing said auto window into a window opening defined by a L-shaped body panel flange with said peripheral molding serving to properly space said window from said flange and introducing a curable adhesive into a space between the window and flange which, upon curing, secures said auto window to said body panel flange.

* * * * *